Dec. 16, 1947.     A. M. FEDDE     2,432,613
GYROSCOPE SIGHTING SYSTEM HAVING A FIXED LINE OF SIGHT
Original Filed July 5, 1941
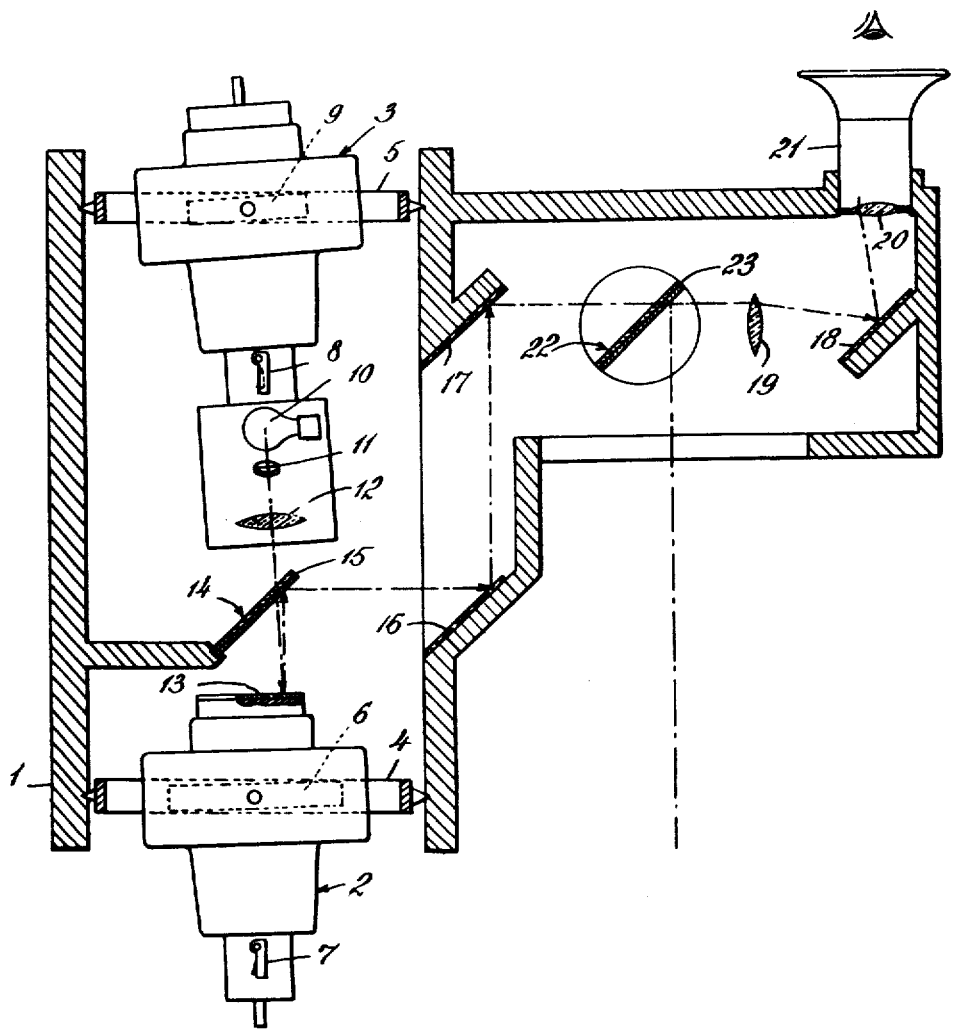
INVENTOR
Arnold M. Fedde
BY
ATTORNEY Patented Dec. 16, 1947

2,432,613

UNITED STATES PATENT OFFICE 2,432,613

GYROSCOPE SIGHTING SYSTEM HAVING A FIXED LINE OF SIGHT

Arnold M. Fedde, Brooklyn, N. Y.

Original application July 5, 1941, Serial No. 401,235. Divided and this application November 17, 1943, Serial No. 510,612

3 Claims. (Cl. 88—1)

This invention relates to gyroscope systems and more particularly to a system including two similar gyroscopes so constructed and arranged that relative angular displacement of the gyroscopes indicates with a high degree of accuracy the displacement of each gyroscope from its normal or neutral position. This application is a divisional application based on my original application, Serial Number 401,235, filed July 5, 1941 now Patent No. 2,350,303.

Any stabilizing mechanism employed for the purpose of causing a gyroscope to maintain a preferred position is of course affected by all forces acting on the system. For example, where a gyro vertical is used on an airplane, acceleration forces other than the force of gravity act on the control mechanism, and whenever there is a change in the direction or magnitude of the resultant force acting on the system there is a corresponding precession of the gyroscope whereby its axis of rotation seeks the direction of this resultant force. In this way errors are introduced which may be of considerable magnitude, and, while such errors persist the gyroscope axis does not give a true indication of the vertical. Heretofore, various schemes have been devised with a view to curbing or eliminating the errors which would otherwise occur during the operation of a stabilized gyroscope, for, in most instances, reliance must be placed on the position of the gyroscope axis as an approximate indication of some selected position such as the true vertical or horizontal. The auxiliary devices heretofore employed for such purposes generally fail to give wholly reliable results.

In general, the principal object of my invention is to provide a gyroscope system including two gyroscopes, the system being of such a nature that it is not necessary to employ any auxiliary devices with a view to modifying or eliminating the errors which normally occur during the operation of any stabilized gyroscope employed in the system. This invention is based on a realization of the fact that a combination of two stabilized gyroscopes having the same kind of error law but of unequal sensitivity, provides an extremely accurate means for determining the departure of either gyroscope from its neutral or normal position. Thus a preferred embodiment of my invention comprises two gyro verticals with means associated with the system whereby the gyroscopes are of unequal sensitivity so that any change in the direction or magnitude of the acceleration forces acting on the system causes relative angular displacement of the gyro axes.

Thus if the rate of precession of one gyroscope is twice that of the other gyroscope and at any given moment it is observed that the relative angular displacement of the two gyroscopes is 2 degrees, it is apparent that the axis of the faster moving gyroscope is inclined at an angle of 4 degrees to the vertical and the axis of the slower moving gyroscope is inclined at an angle of 2 degrees to the vertical. For some applications it is not necessary to have the ratio of response 2 to 1 but in general I prefer to have the ratio of response at least 1.3 to 1 so that the relative angular displacement of the gyro axes will be appreciable and therefore readily determinable for the desired purpose. One gyroscope may be rendered more sensitive than the other by reducing the speed of rotation of the gyro rotor, by employing a rotor of less rotational mass, (i. e. moment of inertia) by applying a greater erecting torque, or by employing a combination of these methods of increasing the sensitivity. It will be understood that the sensitivity of the gyroscope is its rate of precession or response to any change in the forces acting on the gyroscope and that two gyroscopes may be said to have the same error law when their response to a change in the forces acting on them is similar except for the rate of response.

As noted above, an object of this invention is to provide a gyroscope system including two gyroscopes having the same error law but unequal sensitivity, and arranged so that the relative angular displacement of the gyro axes provides an accurate indication of the displacement of either gyroscope from its normal or neutral position. A further object of this invention is to provide a specific application of such a gyroscope system whereby the errors of the separate gyroscopes are automatically cancelled for the practical purpose of providing an accurate indication of a selected position, for example the true vertical.

As an example of one embodiment of my invention, two gyroscopes of the horizon gyro, or gyro vertical type may have their gimbal rings mounted in a suitable support with the gyro axes of rotation in alignment or parallel to each other. One of the gyroscopes, which may be called the pilot gyro, is twice as sensitive as the other gyro which may be termed the master gyro. This difference in sensitivity is preferably attained by utilizing in the pilot gyro a rotor having substantially one-half the rotational mass of the rotor of the master gyro, or, if the rotors are of the same mass, then the increased sensitivity may be obtained by applying greater erecting torque or reducing the speed of rotation of the pilot gyro rotor to a value equal to substantially one-half the speed of rotation of the master gyro rotor, or any desired combination of these methods may be employed. The pilot gyro has associated therewith some convenient means for projecting an image in a direction parallel to or in alignment with the axis of this gyroscope and the master gyro has associated with it a mirror having its surface at right angles to the axis of the master gyro, the arrangement being such that the image is reflected by this mirror. A conventional sighting system or telescope mechanism may be associated with the gyros in such a way that the reflected image is visible therein. This system is such that the image is reflected from the mirror along a path that is substantially vertical, regardless of the positions of the gyros with respect to each other, or with respect to the frame supporting the gyros. If the system is used in an airplane, for example, the telescope mechanism may be such that the observer may see the reflected image and objects below the airplane, and because of the fact that the image is reflected along the vertical, objects sighted below the airplane in alignment with this image are necessarily vertically below the observer.

The various objects and advantages of my invention will be more apparent upon considering the following detailed description of a specific embodiment of the invention illustrated in the accompanying drawing, the single figure of which is a vertical section view, largely diagrammatic, of a gyroscope system including sighting or telescope mechanism associated with the gyroscopes.

In the accompanying drawing the frame or support 1 carries a pair of gyroscopes 2 and 3 having rotors rotating in the same direction and each having the usual gimbal ring of Cardan mounting as shown at 4 and 5.

The gyroscope 2, which may be termed a master gyro, comprises a casing containing the gyro rotor 6 and some means (such as an air jet mechanism, not shown) for causing the gyro rotor to rotate at the desired speed. Each gyroscope is provided with some means for causing the gyro axes to seek the vertical. Such means are familiar to those skilled in this art and for the purpose of illustration I have shown pendulous vanes controlling air ports in the gyro casings. Thus the master gyro 2 is equipped with four such vanes in accordance with the usual practice, one of the vanes being shown at 7, and the gyroscope 3, which may be characterized as a pilot gyro, is likewise equipped with four pendulous vanes, one of which is illustrated at 8. The pendulous vanes on each gyro take positions in alignment with the resultant of acceleration forces acting on the system and cause the gyro to seek the direction of this resultant.

The pilot gyro 3 is more sensitive than the master gyro 2 or, in other words, the rate of response of the pilot gyro to forces tending to cause precession of the gyroscopes is greater than that of the master gyro 2. This difference in sensitivity may be attained in various ways, one of which is to use in the pilot gyro a rotor having less rotational mass than the rotor employed in the master gyro. For the purpose of illustrating this diagrammatically I have shown the rotor 9 of the pilot gyro as being of smaller dimensions than the rotor 6 of the master gyro and for the particular system illustrated in the drawing the rotational mass of the rotor 9 may be substantially one-half that of the rotor 6 where both rotors are caused to rotate at the same speed. It is to be understood however that the desired difference in sensitivity may be obtained partly or entirely by varying the angular velocity of the gyro rotors. Thus if rotors of equal mass are employed the pilot gyro may be rendered twice as sensitive as the master gyro by causing the pilot gyro rotor to rotate at substantially one-half the speed of rotation of the master gyro rotor. Furthermore, the gyros may be of such design and construction that the erecting torque of the pilot gyro is greater than that of the master gyro. My preferred method of attaining the desired difference in sensitivity however is to employ in the pilot gyro a rotor having a smaller rotational mass than that of the master gyro for in this way friction errors which might be introduced where other methods are employed, are avoided. In any event the gyro rotors rotate in the same direction and both gyros may be said to have the same error law although they are of different sensitivity.

The gyroscope system illustrated in the accompanying drawing includes sighting mechanism and means for projecting an image which is invariably reflected along a vertical path regardless of the relative angular position of the gyroscopes, thus providing a system admirably suited for use on airplanes and the like for accurate sighting purposes. To this end the pilot gyro 3 has associated therewith a source of light 10, a reticle 11 and a collimating lens 12 so arranged that the reticle image is projected in alignment with or parallel to the axis of rotation of the pilot gyro. For example, a source of light, reticle and lens may be carried by the pilot gyro casing, or otherwise associated with the pilot gyro so that the projected beam of light follows a path, the direction of which is always in alignment with or parallel to the axis of the pilot gyro. In like manner a mirror 13 is associated with the master gyro in such a way that its plane is invariably at right angles to the axis of rotation of the master gyro rotor. This mirror 13 may be mounted on the casing of the master gyro, or otherwise associated with it, so that its movements are synchronized with those of the master gyro. A laminated light transmitter and reflector 14 having a half silvered surface 15 is mounted in the path of the beam of light projected from the light source 10 and is inclined at an angle so that the rays of light reflected from the half silvered surface 15 are projected laterally into a conventional sighting or telescope system, as indicated by the arrows. This sighting system is diagrammatically shown as mounted in fixed relation with respect to the common gyro support and may include a system of reflecting mirrors such as those shown at 16, 17 and 18 and suitable lenses such as those illustrated at 19 and 20, an eye-piece being shown at 21. A laminated light transmitting and reflecting element 22 may be mounted in the path of the reflected beam of light, this element being provided with a half silvered surface 23 and inclined at an angle so that objects at right angles to the beam of light transmitted to this element may be viewed through the sighting system.

To illustrate the operation of the specific embodiment of my invention illustrated in the accompanying drawing the sides of the support 1 are shown in a vertical position, and the pilot gyro 3 is shown with its axis inclined at an angle of 4 degrees to the vertical. The axis of the master gyro 2 is inclined at an angle of 2 degrees to the vertical. The gyroscopes are thus in the positions they would occupy after a change in the resultant of the acceleration forces acting on the system had caused precession of the gyro axes away from their normal vertical positions. The vanes 7 and 8 are vertical, thus indicating that the force causing the precession of the gyros is no longer effective and thus the vanes are in a position to cause erection of the gyros to their vertical position. Inasmuch as the master gyro 2 is inclined at an angle of 2 degrees to the vertical the mirror 13 is necessarily inclined at an angle of 2 degrees to its normal horizontal position and the beam of light projected onto this mirror is reflected along a vertical path, because the angle of incidence is of course equal to the angle of reflection. The observer thus sees the image of the reticle reflected along a vertical path. If the system is mounted on an airplane the observer can sight objects on the ground in alignment with the image of the reticle and such objects are necessarily sighted along a vertical path. In this system the errors of the gyroscopes are automatically cancelled and the observer may sight along a vertical path regardless of the precession of the gyroscopes away from their normal vertical positions. If the airplane is inclined at an angle to the horizontal the support 1 will be inclined to the same extent and if the resultant acceleration force acting on the system has not caused precession of the gyroscopes their axes will be parallel to each other, both axes being vertical and the image reflected by the mirror 13 will of course be reflected along a vertical path. If precession of the gyroscope occurs while the plane is thus inclined to the horizontal the amount of displacement of the pilot gyro from its vertical position will be twice the amount of displacement of the master gyro from its vertical position and the image will be reflected from the mirror 13 along the vertical path. Whenever it is noted that the gyro axes are inclined at an angle to each other this is an indication of the fact that extraneous forces have caused precession of the gyroscopes but, as noted above, in this sighting system the errors are in effect neutralized or canceled and the reflected image invariably follows a path that is vertical, ignoring of course such errors as may be due to operation of the system at latitudes other than at the poles, and other gyroscope errors familiar to those skilled in the art and which can be compensated for by well-known methods. In general, my improved system is such that relative angular displacement of the gyroscopes provides an accurate indication of the displacement of each gyroscope from its normal or neutral position. The gyroscopes may be of ordinary construction such for example as the familiar horizon gyro, with means for rendering one of the gyros more sensitive or responsive than the other gyro and in the sighting system illustrated in the accompanying drawing the pilot gyro should be substantially twice as sensitive as the master gyro, thus insuring the reflection of the reticle image along a vertical path.

It will be understood from the foregoing description that my invention contemplates the use of two stabilized gyroscopes of unequal sensitivity so arranged with respect to each other that they are each free to respond to any change in in the forces acting on the system, whereby the relative displacement of the gyroscopes is commensurate with the displacement of either one of the gyroscopes. Such a device is capable of maintaining a fixed direction condition in the system. In the embodiment of the invention illustrated in the accompanying drawing, for example, the sighting and image projecting mechanism associated with the gyroscopes indicates a true vertical position at all times regardless of the precession of the gyroscopes.

It is to be understood that my invention is not confined to the particular embodiments herein described in detail but includes such modifications thereof as fall within the scope of the appended claims.

I claim:

1. A sighting system of the type described comprising two gyroscopes having the same error law, one of said gyroscopes being substantially twice as sensitive as the other gyroscope, a support, Cardan mountings on said support and carrying said gyroscopes, whereby the said gyroscopes may precess independently of each other in response to acceleration forces acting on the system, a mirror connected to the less sensitive gyroscope so that the plane of the mirror is at right angles to the axis thereof at all times, means connected to the other gyroscope for projecting an image onto said mirror in the direction of the axis of said other gyroscope whereby the image is reflected by said mirror in a fixed direction regardless of the amount of precession of said gyroscopes, sighting means for an observer, and means for directing the projected image into the line of sight of an observer looking through said sighting means.

2. A sighting system of the type described comprising two stabilized gyroscopes of unequal sensitivity and having the same error law, a support, means for mounting said gyroscope on said support independently of each other so that each gyroscope may precess independently of the other gyroscope in response to any change in acceleration forces acting on the system, a mirror connected to the less sensitive gyroscope so that its plane is at right angles to the axis thereof and so that the mirror is displaced in response to the precession movement of said gyroscope to an extent commensurate with this precession movement, means connected to the other gyroscope for projecting an image onto said mirror in the direction of the axis of said other gyroscope whereby the image is reflected by said mirror in a fixed direction regardless of the extent of the precession of the said gyroscopes, sighting means for an observer, and means for directing the projected image into the line of sight of an observer looking through said sighting means.

3. A sighting system of the type described comprising two stabilized gyroscopes of unequal sensitivity and having the same error law, a support, means for mounting said gyroscopes on said support independently of each other so that each gyroscope may precess independently of the other gyroscope in response to any change in acceleration forces acting on the system, the axes of rotation of the two gyroscopes normally extending in the same direction, a mirror connected to the less sensitive gyroscope so that its plane is at right angles to the axis thereof and so that the mirror is displaced in response to the precession movement of said gyroscope to an extent commensurate with this precession movement, means connected to the other gyroscope for projecting an image onto said mirror in the direction of the axis of said other gyroscope whereby the image is reflected by said mirror in a fixed direction regardless of the extent of the precession of said gyroscopes, sighting means for an observer, and means for directing the projected image into the line of sight of an observer looking through said sighting means.

ARNOLD M. FEDDE.

REFERENCES CITED

The following references are of record in the file of this patent:

UNITED STATES PATENTS

| Number | Name | Date |
|---|---|---|
| 1,980,886 | Talafre et al. | Nov. 13, 1934 |
| 1,760,163 | Morris | May 27, 1930 |
| 1,141,099 | Anschutz | June 1, 1915 |
| 1,524,788 | Gardner | Feb. 3, 1925 |
| 1,628,776 | Henderson | May 17, 1927 |
| 2,350,303 | Fedde | May 30, 1944 |
| 1,573,028 | Bates | Feb. 16, 1926 |
| 940,329 | Krell | Nov. 16, 1909 |

FOREIGN PATENTS

| Number | Country | Date |
|---|---|---|
| 360,390 | Germany | Oct. 2, 1922 |
| 749,767 | France | May 15, 1933 |
| 776,640 | France | Nov. 8, 1934 |
| 751,309 | France | June 19, 1933 |
| 369,130 | Great Britain | Mar. 17, 1932 |

---

Certificate of Correction

Patent No. 2,432,613.                                                                December 16, 1947.

ARNOLD M. FEDDE

It is hereby certified that error appears in the printed specification of the above numbered patent requiring correction as follows: Column 6, line 37, claim 2, for the word "gyroscope" read *gyroscopes*; and that the said Letters Patent should be read with this correction therein that the same may conform to the record of the case in the Patent Office.

Signed and sealed this 2nd day of March, A. D. 1948.

[SEAL]

THOMAS F. MURPHY,
*Assistant Commissioner of Patents.* the precession of said gyroscopes, sighting means for an observer, and means for directing the projected image into the line of sight of an observer looking through said sighting means.

ARNOLD M. FEDDE.

REFERENCES CITED

The following references are of record in the file of this patent:

UNITED STATES PATENTS

| Number | Name | Date |
| --- | --- | --- |
| 1,980,886 | Talafre et al. | Nov. 13, 1934 |
| 1,760,163 | Morris | May 27, 1930 |
| 1,141,099 | Anschutz | June 1, 1915 |
| 1,524,788 | Gardner | Feb. 3, 1925 |
| 1,628,776 | Henderson | May 17, 1927 |
| 2,350,303 | Fedde | May 30, 1944 |
| 1,573,028 | Bates | Feb. 16, 1926 |
| 940,329 | Krell | Nov. 16, 1909 |

FOREIGN PATENTS

| Number | Country | Date |
| --- | --- | --- |
| 360,390 | Germany | Oct. 2, 1922 |
| 749,767 | France | May 15, 1933 |
| 776,640 | France | Nov. 8, 1934 |
| 751,309 | France | June 19, 1933 |
| 369,130 | Great Britain | Mar. 17, 1932 |

Certificate of Correction

Patent No. 2,432,613.      December 16, 1947.

ARNOLD M. FEDDE

It is hereby certified that error appears in the printed specification of the above numbered patent requiring correction as follows: Column 6, line 37, claim 2, for the word "gyroscope" read *gyroscopes*; and that the said Letters Patent should be read with this correction therein that the same may conform to the record of the case in the Patent Office.

Signed and sealed this 2nd day of March, A. D. 1948.

[SEAL]

THOMAS F. MURPHY,
*Assistant Commissioner of Patents.*